(12) United States Patent
Wade

(10) Patent No.: US 9,627,832 B2
(45) Date of Patent: Apr. 18, 2017

(54) LOCK MEMBER FOR A ROTARY CONNECTOR DEVICE

(71) Applicant: AMERICAN FURUKAWA, INC., Plymouth, MI (US)

(72) Inventor: Jere Wade, Swartz Creek, MI (US)

(73) Assignee: AMERICAN FURUKAWA, INC., Plymouth, MI (US)

( * ) Notice: Subject to any disclaimer, the term of this patent is extended or adjusted under 35 U.S.C. 154(b) by 28 days.

(21) Appl. No.: 14/451,099

(22) Filed: Aug. 4, 2014

(65) Prior Publication Data
US 2016/0036184 A1 Feb. 4, 2016

(51) Int. Cl.
*H01R 39/64* (2006.01)
*B60R 16/027* (2006.01)

(52) U.S. Cl.
CPC ........... *H01R 39/64* (2013.01); *B60R 16/027* (2013.01)

(58) Field of Classification Search
CPC ...... H01R 35/04; H01R 35/025; H01R 39/64; H01R 2201/26; B60R 16/027; B60R 16/0207; Y10T 403/32254; Y10T 403/32975; Y10T 403/11; Y10T 403/16; Y10T 403/1608; Y10T 403/1616; Y10T 403/1649
USPC ........... 403/348, 350, 351, 2, 11, 12, 13, 17; 439/15, 16, 134
See application file for complete search history.

(56) References Cited

U.S. PATENT DOCUMENTS

| | | | | |
|---|---|---|---|---|
| 5,248,260 A * | 9/1993 | Ida | ......................... | H02G 11/02 439/15 |
| 5,257,943 A * | 11/1993 | Ueno | ................... | H01R 35/025 439/15 |
| 5,429,517 A * | 7/1995 | Bolen | ................... | B60R 16/027 439/15 |
| 5,662,486 A * | 9/1997 | Kato | ..................... | H01R 35/025 439/15 |
| 5,741,145 A * | 4/1998 | Kikkawa | ............... | H01R 35/025 439/15 |
| 5,871,366 A * | 2/1999 | Nishikigi | .............. | B60R 16/027 439/15 |
| 5,913,488 A * | 6/1999 | Miho | .................... | B60R 16/027 242/388 |

(Continued)

FOREIGN PATENT DOCUMENTS

JP 2005327575 11/2005

OTHER PUBLICATIONS

Machine translation of JP 2005-327575A, obtained from https://www4.j-platpat.inpit.go.jp/cgi-bin/tran_web_cgi_ejje?u=http://www4.j-platpat.inpit.go.jp/eng/translation/20160223032901967298650208285998097ECD5BFC99B85D7AE0672ABE6DB57CE4 (last accessed Feb. 22, 2016).*

*Primary Examiner* — Theodore Adamos
(74) *Attorney, Agent, or Firm* — Cantor Colburn LLP

(57) ABSTRACT

A lock member for a rotary connector device includes a ring portion defining an aperture. Also included is a first leg. Further included is a second leg, wherein the lock member is moveable between a first configuration and a second configuration, the first configuration comprising the first leg disposed within a slot of a rotating member of the rotary connector device and the second leg disposed within a pocket of a fixed member of the rotary connector device, the second configuration comprising the second leg disposed within the slot of the rotating member and the first leg disposed within the pocket of the fixed member.

7 Claims, 5 Drawing Sheets

(56) References Cited

U.S. PATENT DOCUMENTS

| | | | | |
|---|---|---|---|---|
| 6,042,405 A | * | 3/2000 | Masuda | H01R 35/025 439/15 |
| 6,213,798 B1 | * | 4/2001 | Kawamura | B60R 16/027 439/164 |
| 6,309,233 B1 | * | 10/2001 | Nakade | B60R 16/027 439/164 |
| 6,488,225 B2 | * | 12/2002 | Maegawa | B60R 16/027 242/385.4 |
| 6,516,642 B1 | * | 2/2003 | Vito | B60R 25/0221 70/209 |
| 6,662,607 B2 | * | 12/2003 | O'Neal | B60R 25/09 70/226 |
| 7,452,224 B1 | * | 11/2008 | McDonald | B60R 16/027 439/164 |
| 8,382,500 B2 | | 2/2013 | Adachi | |
| 8,529,272 B2 | | 9/2013 | Kamiya | |
| 2012/0329314 A1 | * | 12/2012 | Adachi | B60R 16/027 439/501 |
| 2013/0000953 A1 | | 1/2013 | Park et al. | |
| 2013/0248220 A1 | | 9/2013 | Arakawa | |

\* cited by examiner

LOCK MEMBER FOR A ROTARY CONNECTOR DEVICE

BACKGROUND OF THE INVENTION

The subject matter disclosed herein relates to rotary connector devices and, more particularly, to a lock member employed with such devices to prevent rotation of portions of the devices.

Conventionally, various types of rotary connectors are known for electrically connecting a rotating side and a fixed side, such as a steering side and a vehicle body side of a vehicle. In such an embodiment, a rotary connector device includes a first casing configured to be rotated integrally with a steering wheel, and a second casing configured not to follow rotation of the steering wheel. In these casings, a steering shaft (insert) can be inserted. These casings have an annular space formed therein. In the annular space, a flexible flat cable that electrically connects a steering side member and a vehicle body side member to each other is arranged.

The first casing includes a rotor. The rotor is fixed to the steering shaft such that the rotor is rotatable integrally with the steering wheel. In this configuration, when the steering shaft rotates, a force is transmitted from the steering shaft so that the rotor is rotated. The second casing includes a stator and a sub stator. The stator is fixed to a steering column such that the stator does not follow rotation of the steering. The sub stator is fixed to the stator by snap-fitting. In this configuration, even when the steering shaft rotates, the stator and the sub stator are not rotated.

Multiple stages of the assembly chain process require testing of the rotary connector device. For example, it may be critical that rotational components of the device are maintained in a centered position to avoid over-rotation and potential damage to various components. Shipment may be made from a manufacturer of the device to an intermediate party for additional assembly to other components or systems before ultimately sending to a final manufacturing facility. The intermediate party may need to rotate the device. Various locking pins or mechanisms have been employed to maintain the device in a centered condition, however, multiple pins or mechanisms have been required due to the need for multiple shipments and intermediate rotations before final assembly.

BRIEF DESCRIPTION OF THE INVENTION

According to one aspect of the invention, a lockable rotary connector device includes a rotating member including a connecting portion and a cylindrical part, the rotating member being configured to be mounted such that the rotating member is rotated integrally with an insert inserted in the cylindrical part. Also included is a fixed member including a second cylindrical part, the fixed member being mounted such that the fixed member does not follow rotation of the insert inserted in the second cylindrical part and such that the fixed member is in contact with the rotating member. Further included is a lock member having a first leg and a second leg, the lock member is moveable between a first configuration and a second configuration, wherein the first leg is configured to be inserted into a slot of the rotating member in the first configuration, wherein the second leg is configured to be inserted into the slot in the second configuration.

According to another aspect of the invention, a method of locking a rotary connector device is provided. The method includes inserting a lock member into a slot of a rotating member that is operatively coupled to a fixed member, wherein the lock member is insertable into the rotating member in a first configuration, wherein the first configuration comprises a first leg of the lock member removably inserted into the slot. The method also includes inserting a second leg of the lock member into a pocket of the fixed member in the first configuration of the lock member, wherein the second leg prevents rotation of the rotating member relative to the fixed member in the first configuration of the lock member. The method further includes removing the first leg of the lock member from the slot and inserting a second leg of the lock member into the slot and the first leg into the pocket to establish a second configuration of the lock member, wherein the first leg prevents rotation of the rotating member relative to the fixed member in the second configuration of the lock member. The method yet further includes fixedly engaging the second leg of the lock member with the rotating member in a non-removable manner.

According to yet another aspect of the invention, a lock member for a rotary connector device includes a ring portion defining an aperture. Also included is a first leg. Further included is a second leg, wherein the lock member is moveable between a first configuration and a second configuration, the first configuration comprising the first leg disposed within a slot of a rotating member of the rotary connector device and the second leg disposed within a pocket of a fixed member of the rotary connector device, the second configuration comprising the second leg disposed within the slot of the rotating member and the first leg disposed within the pocket of the fixed member.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
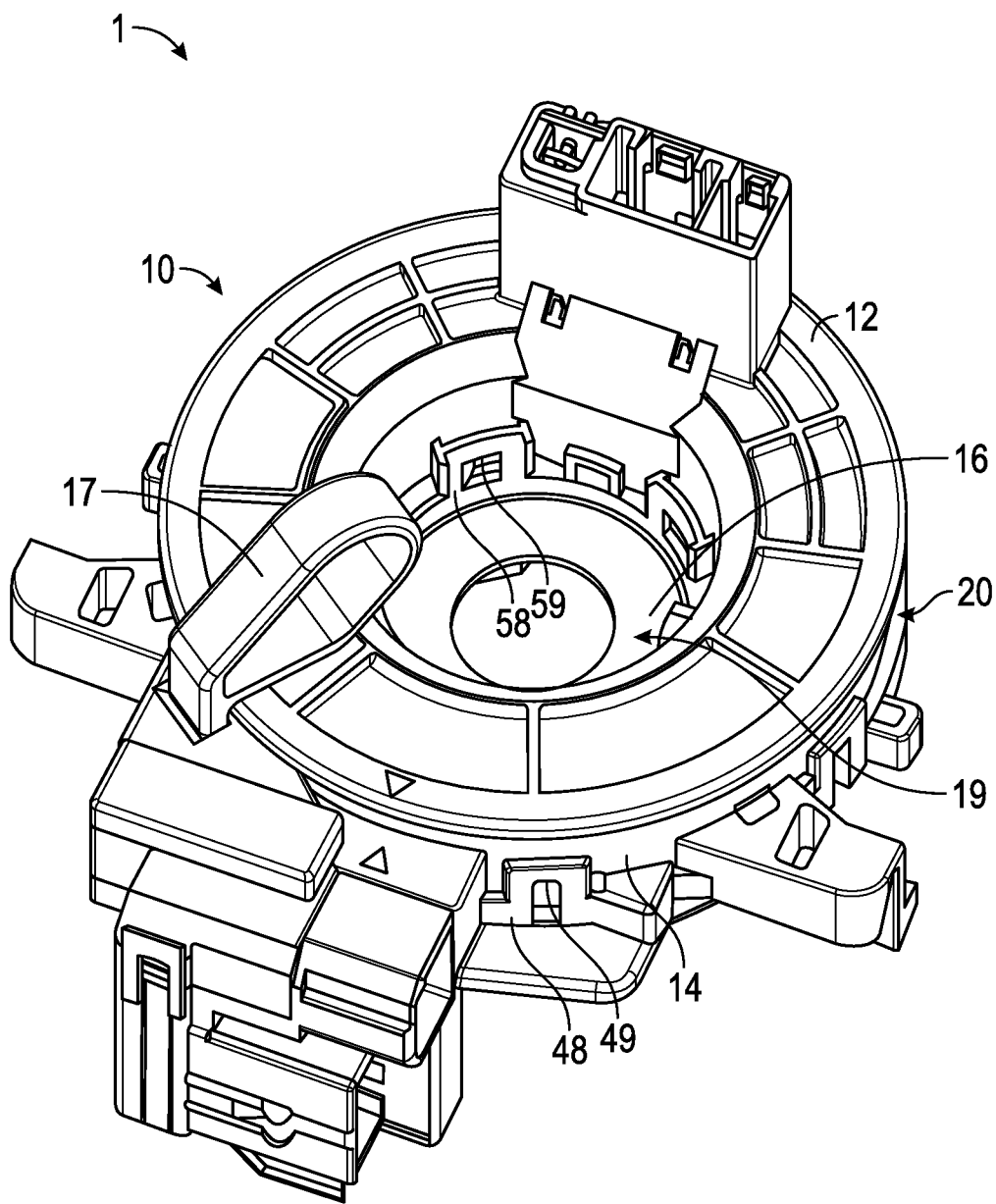
FIG. 1 is a perspective view of a rotary connector device employing a conventional locking pin.

Referring to FIG. 1, a rotary connector device, such as a steering roll connector 1 is illustrated according to one embodiment of the present invention. Although described herein as a steering roll connector that may be disposed in an automobile in conjunction with a steering assembly, it is to be appreciated that the embodiments disclosed herein may relate to any rotary connector device. The steering roll connector 1 serving as a rotary connector device includes a cable housing 10 having a rotor 12 (also referred to herein as a rotating member or first rotating member) and a stator assembly 20 (also referred to herein as a fixed member). In one embodiment, the stator assembly 20 is composed of a stator (first fixed member) and a sub stator (second fixed member).

The stator assembly 20 is fixed directly to a steering column, or indirectly to a steering column by means of an intermediate mounting bracket (not shown). An insertion hole 19 in the shape of a through hole is formed at the center of the cable housing 10. A steering shaft supported on the steering column is inserted into the insertion hole 19. The stator is rotatably mounted relative to the steering shaft.

The stator has a projection 48 (also referred to herein as a second connecting portion), and the sub stator has a claw 49 (also referred to herein as a second connecting object portion) formed at a position corresponding to the projection 48. The projection 48 is hooked to the claw 49 (snap-fitting), and therefore the sub stator is unrotatably mounted relative to the stator. Accordingly, not only the stator, but also the sub stator is rotatable relative to the steering shaft. On the other hand, the rotor 12 is fixed to the steering shaft such that it is rotated integrally with the steering shaft. A steering wheel is operatively coupled to the steering shaft.

Although a particular embodiment of the steering roll connector 1 is illustrated in FIG. 1, as one skilled in the art will appreciate, the embodiments of the lock member described herein may be employed with multiple embodiments of steering roll connectors. The illustrated example is merely illustrative and is not limiting of the embodiments of steering roll connectors that the lock member may be employed with. For example, what may be referred to as a 3-piece embodiment or a 4-piece embodiment of a steering roll connector may benefit from the lock member described herein.

In a 4-piece embodiment, the steering roll connector 1 includes a sleeve 16 (also referred to herein as a second rotating member) fixed to the rotor 12. The sleeve 16 has a projection 58 (also referred to herein as a connecting object portion), and the rotor 12 has a claw 59 (also referred to herein as a connecting portion) formed at a position corresponding to the projection 58. The projection 58 is hooked to the claw 59, and thereby the sleeve 16 is unrotatably mounted relative to the rotor 12 in a snap-fitting arrangement. Since it is necessary to pivotally support the stator by sandwiching it between the rotor 12 and the sleeve 16, the rotor 12 and the sleeve 16 are formed as separate parts and they are fixed to each other by snap-fitting. An upper surface of the sleeve 16 and a lower surface of the stator are configured to be in contact with each other.

In a 3-piece embodiment, the steering roll connector 1 does not include a second rotating member. In such an embodiment, the stator and sub-stator sandwich only a single rotating member.

As shown in FIG. 1 and irrespective of whether the steering roll connector is a 3 or 4 piece embodiment (or any other embodiment), a lock member 17 is inserted into a portion of the steering roll connector 1 to prevent rotation of the rotor 12. The lock member 17 will be described in detail below, with additional figures illustrating the embodiments of the lock member 17.

Figure 2:
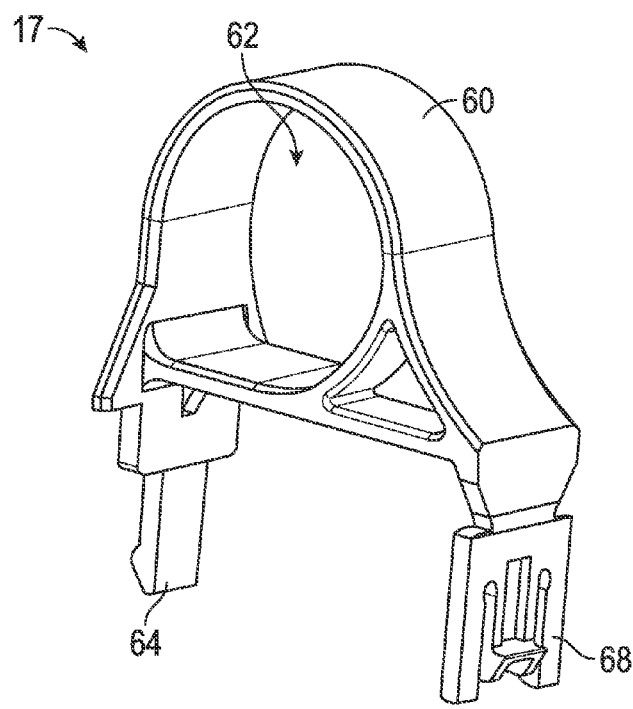
FIG. 2 is a perspective view from a first angle of a lock member for the rotary connector device according to an embodiment of the invention.
Figure 3:
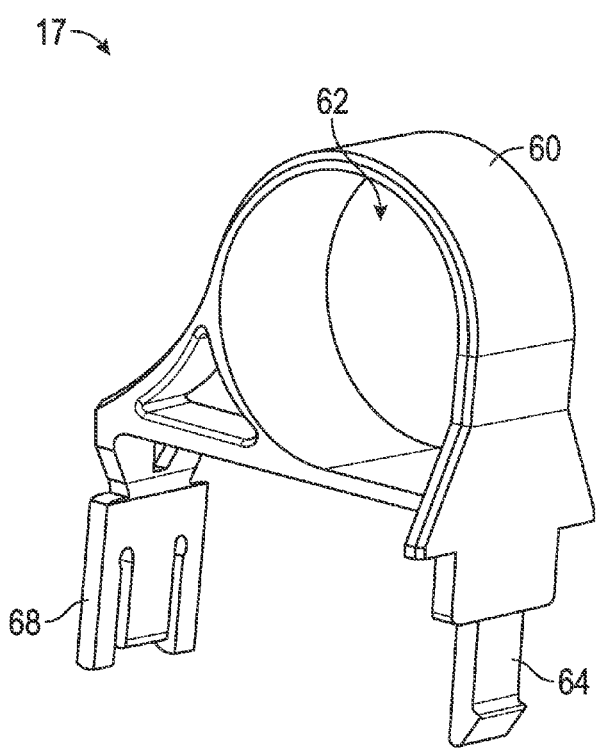
FIG. 3 is a perspective view from a second angle of the lock member.

Referring now to FIGS. 2 and 3, the lock member 17 is a dual rotary locking device that is configured to prevent inadvertent rotation of the rotor 12 of the steering roll connector 1. As will be appreciated from the description herein, the lock member 17 is a locking device that can be used as a replaceable lock for intermediate use and subsequently repositioned to be used as a breakable lock to assure a manufacturer at the end of an assembly/manufacturing process chain that the rotor 12 of the steering roll connector 1 is in an absolute centered position.

The lock member 17 includes a ring portion 60 that defines an aperture 62. The aperture 62 is sized to allow a user to insert a human finger or alternatively a tool into the aperture 62. The aperture 62 facilitates withdrawal of the lock member 17 from the steering roll connector 1, as well as applied torque on the lock member 17 to achieve a broken condition of the lock member 17, as discussed in detail below. The lock member 17 includes a first leg 64 and a second leg 68 that each provides common functionality when inserted into the steering roll connector 1, and more specifically when inserted into the rotor 12.

Figure 4:
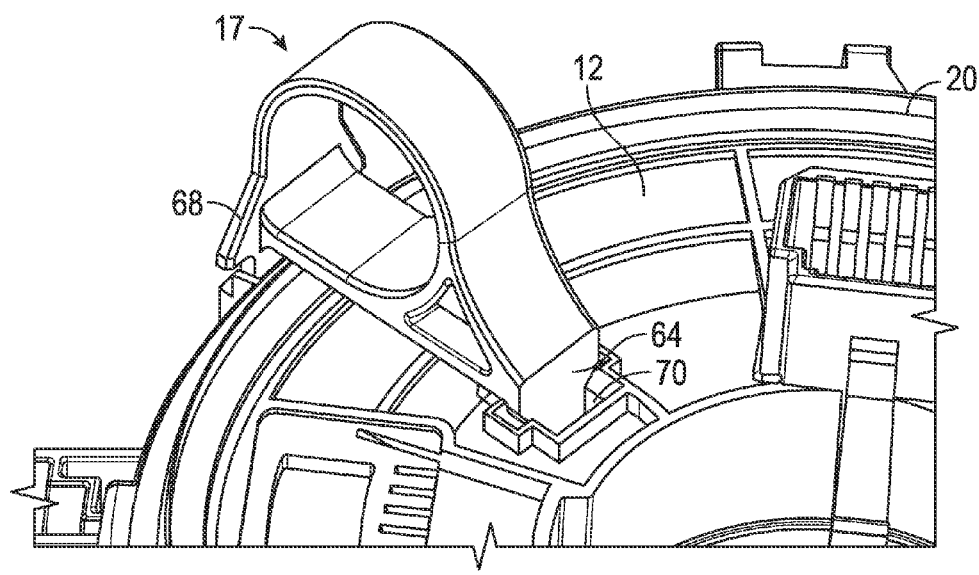
FIG. 4 is a perspective view of the lock member inserted into the rotary connector device in a first configuration according to an aspect of the invention.
Figure 5:
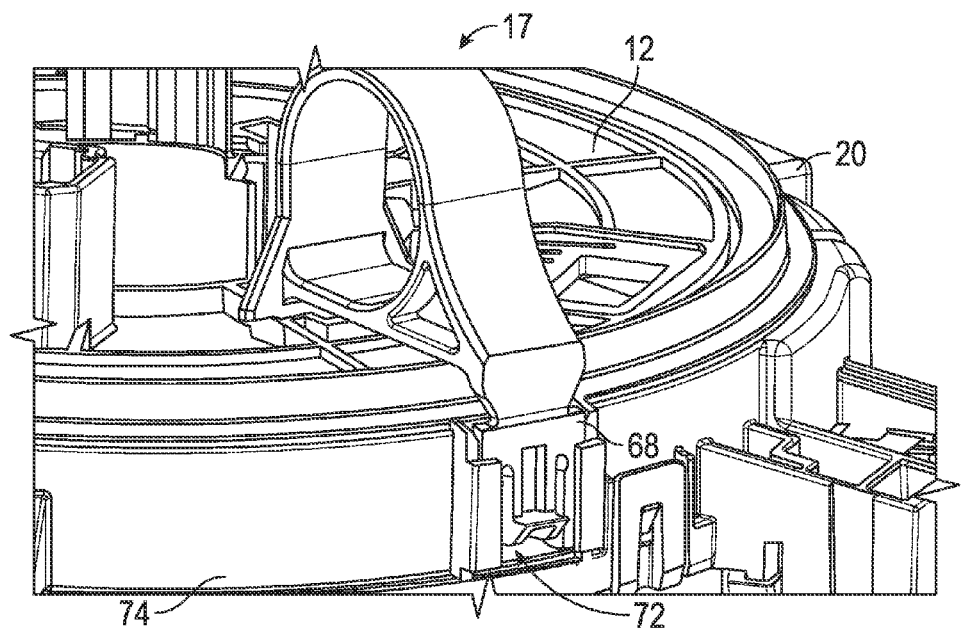
FIG. 5 is a perspective view of the lock member in the first configuration according to another aspect of the invention.

Referring now to FIGS. 4 and 5, with continued reference to FIGS. 1-3, an insertion slot 70 is formed in the rotor 12 and is configured to receive the first leg 64 and the second leg 68 of the lock member 17 at separate times. The stator assembly 20 includes a pocket 72 located along an outer surface 74 of the stator assembly 20. As with the insertion slot 70, the pocket 72 is configured to receive the first leg 64 and the second leg 68 of the lock member 17 at separate times. When the lock member 17 is inserted into the steering roll connector 1, the rotor 12 is locked against rotation relative to the stator assembly 20.

FIGS. 4 and 5 illustrate the lock member 17 disposed in a first configuration. The first configuration corresponds to the first leg 64 being inserted within the insertion slot 70 of the rotor 12 and the second leg 68 being inserted into the pocket 72 of the stator assembly 20. As described above, this configuration prevents relative rotation between the rotor 12 and the stator assembly 20. In the first configuration, the lock member 17 is repeatedly removable from the steering roll connector 1. This is facilitated by the shape of the first leg 64 relative to the geometry of the insertion slot 70. This is in contrast to a second configuration of the lock member 17, which will be described below, where the second leg 68 is non-removably inserted into the insertion slot 70.

Figure 6:
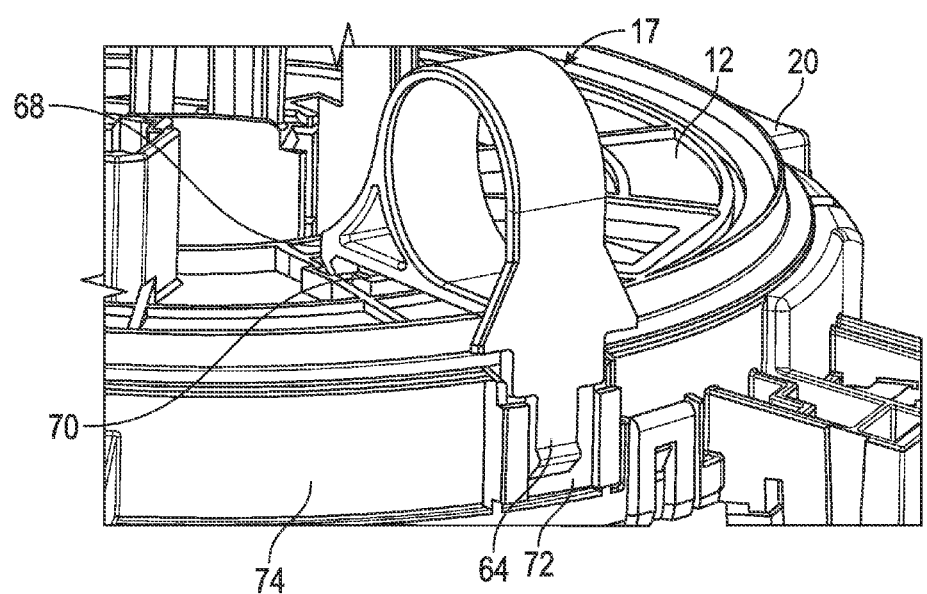
FIG. 6 is a perspective view of the lock member inserted into the rotary connector device in a second configuration.

Referring now to FIG. 6, the lock member 17 is illustrated in a second configuration. The second configuration corresponds to the second leg 68 being inserted within the insertion slot 70 of the rotor 12 and the first leg 64 being inserted into the pocket 72 of the stator assembly 20. As is the case with the first configuration, the second configuration prevents relative rotation between the rotor 12 and the stator assembly 20. The second leg 68 includes a snapping element 76, such as any type of clip for example, that fixedly engages the second leg 68 within the insertion slot 70. The insertion slot 70 includes an interior portion (not shown) that includes a geometry that facilitates the fixed engagement with the second leg 68, thereby ensuring that the second leg 68 can only be inserted once during the operating life of the lock member 17.

Figure 7:
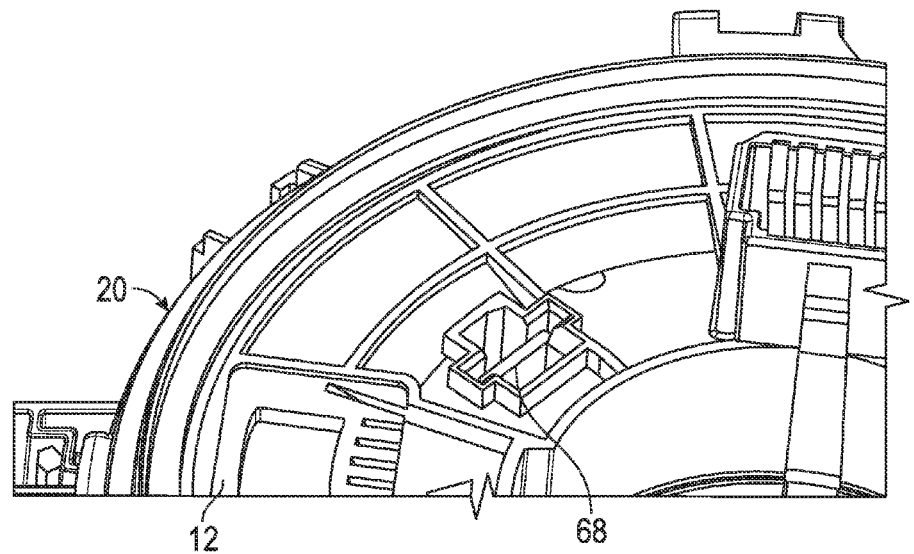
FIG. 7 is a perspective view of a portion of a second leg of the lock member broken off to remain within the rotary connector device.
Figure 8:
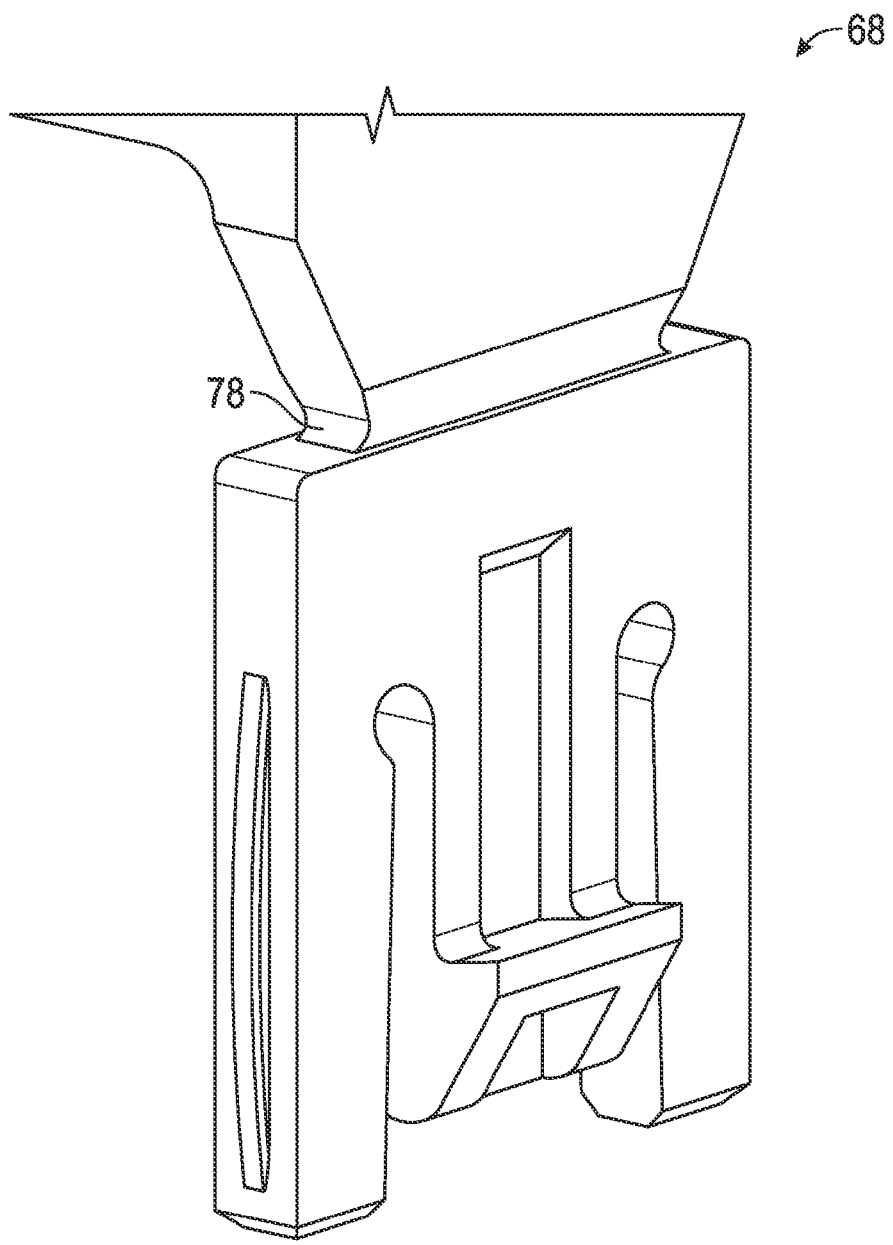
FIG. 8 is a perspective view of the second leg of the lock member.

The embodiments of the lock member 17 described herein allows the lock member 17 to be temporarily attached in the first configuration (FIGS. 4 and 5) at a time of manufacturing the steering roll connector 1, in order to lock the rotational position of the rotor 12. In the first configuration, the lock member 17, and more particularly the first leg 64, can be easily removed to allow rotation of the rotor 12 for intermediate rotational testing by the manufacturer of the steering roll connector 1 or by an intermediary entity of the overall manufacturing and assembly chain. Once the intermediate rotational testing is completed, the lock member 17 is then rotated and re-inserted into the steering roll connector 1 into the second configuration. In the second configuration (i.e., breakable configuration), the second leg 68 is fixedly engaged within the insertion slot 70. As described above, the second leg 68 is inserted in a non-removable manner within the insertion slot 70. More specifically, a portion of the second leg 68 is non-removable. Upon receipt by a final entity of the overall manufacturing and assembly chain, such as an OEM in the case of the automotive industry, the majority of the lock member 17 is removed from the steering roll connector 1. In particular, in the second configuration, a user applies a force or torque proximate the ring portion 60 of the lock member 17 to break the second leg 68. The geometry of the second leg 68 facilitates breaking of the leg within a desirable range of force. As shown in FIG. 8, the second leg 68 includes a necked region 78. The necked region 78 creates a stress riser during the application of force to facilitate a controlled break that leaves a desired amount of the second leg 68 within the insertion slot 70. The precise geometry of the necked region 78 will vary depending on the particular application and how much force is desired to induce a break. Subsequent to breaking the second leg 68, a portion of the second leg 68 remains disposed within the insertion slot 70, as shown in FIG. 7. The vestige remaining within the insertion slot 70 provides visual indication of the prior presence of the lock member 17.

Advantageously, the lock member 17 described herein comprises a single, dual purpose locking device that may be used as a replacement lock for intermediate use and then reversed to be used as a breakable lock. This eliminates the need for multiple locking mechanisms, thereby reducing components required and cost.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A lockable rotary connector device comprising:
a rotating member including a connecting portion and a cylindrical part, the rotating member being configured to be mounted such that the rotating member is rotated integrally with an insert inserted in the cylindrical part;
a fixed member including a second cylindrical part having the insert also disposed therethrough, the fixed member being mounted such that the fixed member does not follow rotation of the insert inserted in the second cylindrical part and such that the fixed member is in contact with the rotating member, the fixed member having an outer diameter surface, an inner diameter surface, and a pocket located along the outer diameter surface of the fixed member; and
a lock member having a first leg and a second leg extending parallel to each other, the lock member moveable between a first configuration and a second configuration, wherein the first leg is insertable into a slot of the rotating member and the second leg is insertable into the pocket in the first configuration, wherein the first leg is insertable into the pocket and the second leg is insertable into the slot in the second configuration, the slot located at an intermediate location between the outer diameter surface and the inner diameter surface, the lock member rotated 180 degrees to transition from the first configuration to the second configuration, the first leg and second leg repeatedly removable from the slot and the pocket, respectively, in the first configuration, without breaking any portion of the first leg and the second leg, the second leg fractured upon removal of the lock member in the second configuration.

2. The lockable rotary connector device of claim 1, wherein a portion of the second leg is non-removably inserted into the slot.

3. The lockable rotary connector device of claim 2, wherein the second leg comprises a snapping element configured to fixedly engage the rotating member within the slot.

4. The lockable rotary connector device of claim 3, wherein a portion of the second leg is configured to remain in the slot of the rotating member subsequent to breaking the second leg in response to application of a predetermined force.

5. The lockable rotary connector device of claim 1, wherein the second leg is in contact with the fixed member in the first configuration, wherein the first leg is in contact with the fixed member in the second configuration, wherein insertion of either the first leg or the second leg into the slot prevents rotation of the rotating member.

6. The lockable rotary connector device of claim 1, wherein the lockable rotary connector device is disposed in an automobile.

7. The lockable rotary connector device of claim 6, wherein the lockable rotary connector device comprises a steering roll connector for a steering wheel assembly.

* * * * *